United States Patent [19]

Lux et al.

[11] Patent Number: 4,679,846
[45] Date of Patent: Jul. 14, 1987

[54] SLIDING AND LIFTING ROOF WITH TILTABLE SLIDING LINER PANEL CONTROLLED BY A GUIDANCE ARRANGEMENT

[75] Inventors: Horst Lux, Herrenberg; Walter Schätzler, Stockdorf/Gauting, both of Fed. Rep. of Germany

[73] Assignees: Webasto-Werk W. Baier GmbH & Co., Gauting; Daimler-Benz Aktiengesellschaft, Stuttgart, both of Fed. Rep. of Germany

[21] Appl. No.: 800,410

[22] Filed: Nov. 21, 1985

[30] Foreign Application Priority Data

Nov. 22, 1984 [DE] Fed. Rep. of Germany ....... 3442615

[51] Int. Cl.⁴ .................. B60R 13/02; B60J 7/047; B60J 7/05; B60J 7/057
[52] U.S. Cl. .................. 296/214; 296/220; 296/221; 296/223
[58] Field of Search ............ 296/214, 216, 221, 222, 296/223, 220

[56] References Cited

U.S. PATENT DOCUMENTS 4,179,156 12/1979 Huisman ............................. 296/216
4,566,730 1/1986 Knabe et al. ...................... 296/223 X

FOREIGN PATENT DOCUMENTS 8107603 10/1981 Fed. Rep. of Germany .
89223 5/1984 Japan ................................. 296/216
89224 5/1984 Japan ................................. 296/216
128011 7/1984 Japan ................................. 296/222
2094723 9/1982 United Kingdom .............. 296/221

Primary Examiner—Robert B. Reeves
Assistant Examiner—Dennis H. Pedder
Attorney, Agent, or Firm—Sixbey, Friedman & Leedom

[57] ABSTRACT

A sliding and lifting roof construction for vehicles having a rigid cover of the type which closes a roof opening in a fixed roof surface in a closed position thereof and is selectively shiftable from the closed position by either being upwardly tilted so that a rear edge of the cover is disposed above the fixed roof surface or by being slid rearwardly after lowering of the cover rear edge below the fixed roof surface, and has a tiltable, sliding roof liner panel that is slidable together with the cover and which, upon raising the cover, is induced into a raising movement that, starting from the closed position of the cover, is faster than the raising movement of the cover; wherein the tiltable siding roof liner panel, at least on one of its sides, is coupled with a pivotable lifting arm. The pivotable lifting arm is designed for providing positive guidance for the pivotable movement thereof in response to movement of a lifting lever of a lifting mechanism for the cover panel in a manner that produces a pivotable movement characteristic for the liner panel that is different from the rate of movement of the cover.

20 Claims, 14 Drawing Figures

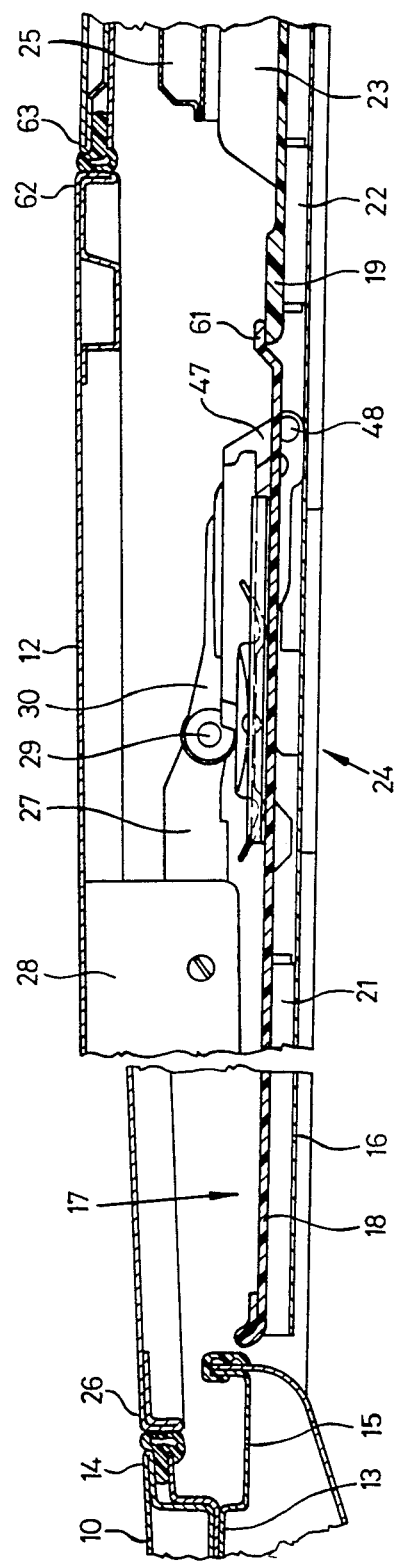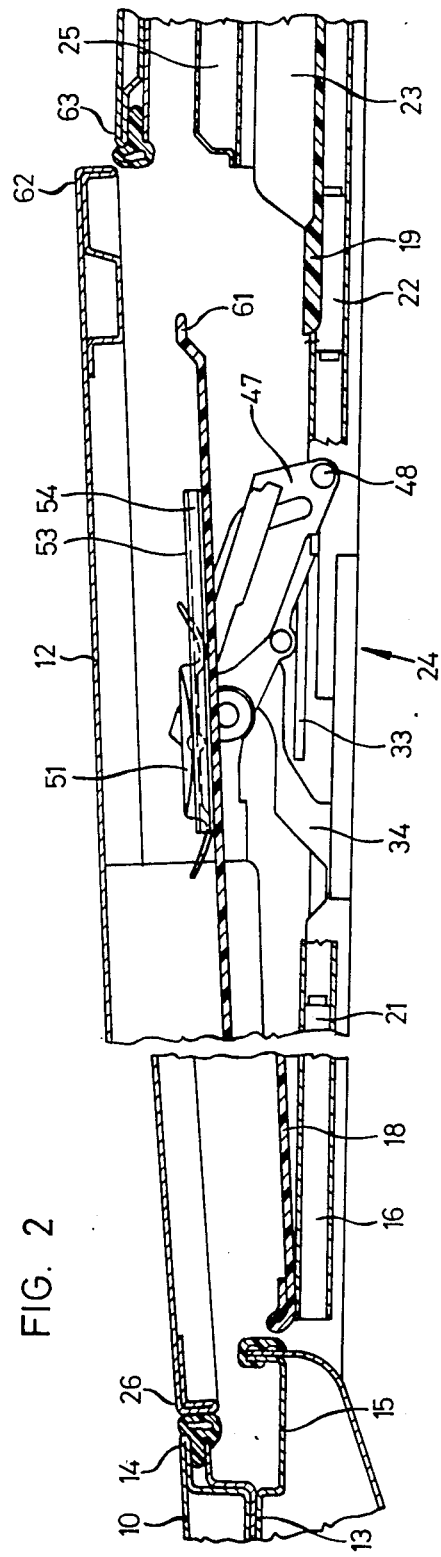

SLIDING AND LIFTING ROOF WITH TILTABLE SLIDING LINER PANEL CONTROLLED BY A GUIDANCE ARRANGEMENT

BACKGROUND AND SUMMARY OF THE INVENTION

The invention relates to a sliding and lifting roof construction for vehicles, having a rigid cover, which in its closed position closes an opening in a fixed roof surface, which cover is mounted on guide rails that extend parallel to the side edges of the roof opening, and which, by way of raising devices disposed at both of its sides, selectively can be raised by lifting of its rear end above the fixed roof surface, or can be slidably displaced by lowering its rear end below the fixed roof surface. The invention also relates to a tiltable, sliding roof liner panel which is slidably displaced together with the cover and which panel, upon lifting of the roof cover, is induced into a raising movement that, starting from an initial point of the cover's closed position is faster than the lifting movement of the cover.

In a known sliding lifting roof of this kind (German No. GM 81 07 603), the roof and the tiltable sliding roof liner panel are connected with at least one hinged element which has two connecting members. One connecting member is supported at one end of the sliding roof liner panel, while at the other end there is engagement with a tension spring. The other connecting member engages the center area of the first connecting member and is supported at the cover. The connecting members are tensioned by the tension spring along the lines of a buckling effect. The end of the tension spring opposite its connection to the hinge element, is mounted on a drive element that is displaceable along a guide track that runs up onto a ramp on the sliding roof liner panel, thereby keeping the sliding roof liner panel in a closed position. During the initial phase of the cover's lifting movement, the drive element disengages itself from the ramp. Under the influence of the tension spring, the sliding roof liner panel is tilted upwardly faster than the cover itself. This has the advantage that in intermediate positions of the raised cover, and particularly at the beginning of the lifting movement, the raised sliding roof liner panel reveals a full or extensive view into the area of the back end of the cover. In the known design, the tension spring, however, has to be of relatively heavy construction in order to prevent vibration of the sliding roof liner panel and rattling noises when the cover is fully or partially raised. The force of the tension spring has to be overcome by the roof cover drive when closing the cover. This necessitates a construction of the cover drive which is substantially heavier than would be required for the movement of the cover alone.

Thus, the primary objective of the invention is to provide a sliding and lifting roof of the kind mentioned which can be operated in a reliable and safe manner while employing a comparatively lighter drive.

This objective is achieved by the present invention in that the tiltable sliding roof liner panel, at least on one of its sides, is coupled with a pivotable lifting arm, whose pivoting movement is positively guided, dependent upon the movement of a lifting lever of a lifting mechanism at the same side of the cover, so as to produce a pivotal movement characteristic which deviates from that of the cover.

The positive guidance feature of the invention eliminates the need for springs for the displacement of the slidable roof liner panel. Accordingly, the drive of the sliding lifting roof does not require additional power to overcome the tensioning force of such springs. A tendency of the tiltable sliding roof liner panel to vibrate, or to have other uncontrolled movements, is effectively counteracted.

A particularly sturdy construction is obtained when, in accordance with a futher feature of the invention, the lifting arm and the lifting lever which guides it, are coupled by a sliding guide means. Advantageously, the sliding guide means is designed to simultaneously serve as a device for holding down the tiltable sliding roof liner panel when the cover is in a closed or lowered position. The sliding guide means, preferably, is designed so that it imposes a constant height upon the tiltable sliding roof liner panel, relative to the guide rails, when the cover is in a closed or lowered position.

The connection between the lifting arm and the sliding roof liner panel is advantageously achieved by a slider, forming part of the sliding guide means, which is pivotably secured to the lifting arm, which slider is rotatable about an axis extending parallel to the pivot axis of the tiltable sliding roof liner panel and is displaceable in a longitudinal direction relative to the sliding roof liner panel. Such a design configuration facilitates a particularly easy assembly of the sliding lifting roof.

Preferably, the slider can be slidably engaged with an angular lifting bracket at the upper side of the tiltable sliding roof liner panel. One end of the lifting arm advantageously is pivotally connected to a support member of the lifting mechanism, which is mounted to be displaceable along the guide rails.

A particularly compact design of the assembly is obtained when the lifting arm and the lifting lever are arranged in a laterally side-by-side configuration, and the lifting lever has a connecting bolt which engages a guide slot in the lifting arm.

These and further objects, features and advantages of the present invention will become more obvious from the following description when taken in connection with the accompanying drawings which show, for purposes of illustration only, one embodiment in accordance with the present invention.

BRIEF DESCRIPTION OF THE DRAWINGS

FIG. 1 is a partial longitudinal section through a sliding and lifting roof with the cover in a closed position;

FIG. 2 is a longitudinal section according to FIG. 1, wherein the cover is in the initial phase of its lifting movement;

DETAILED DESCRIPTION OF THE PREFERRED EMBODIMENT

Figure 3:
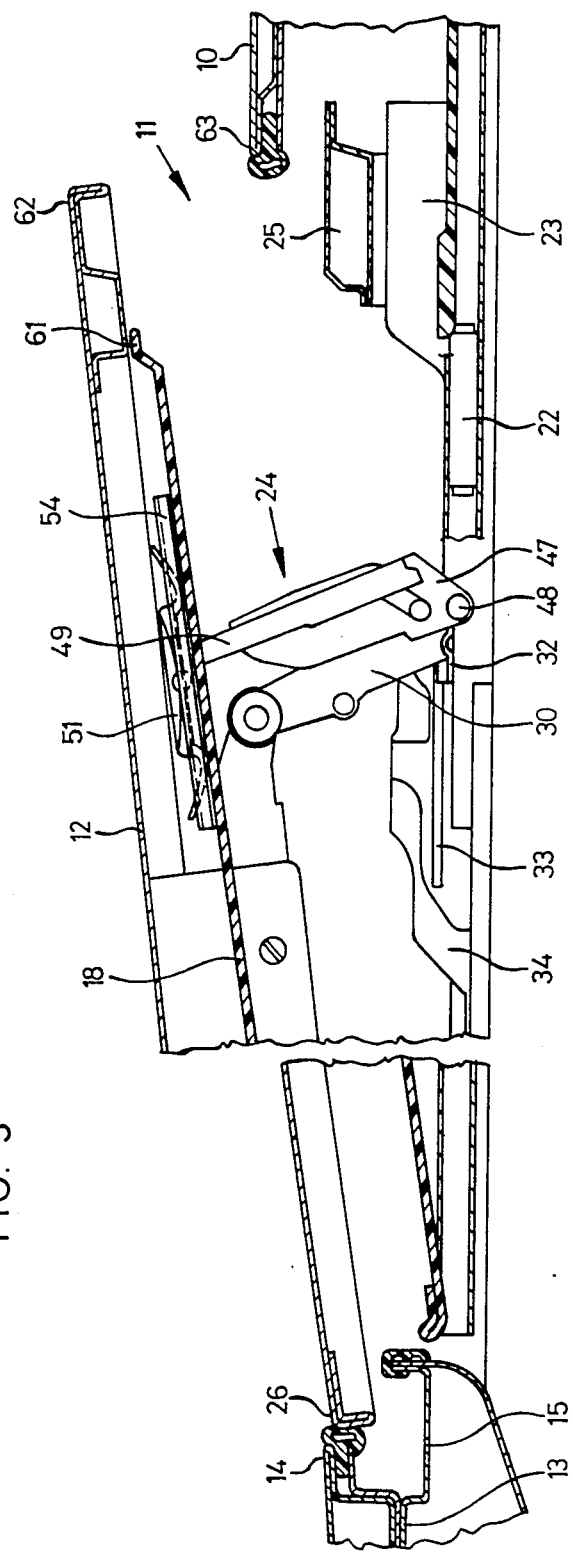
FIG. 3 is a section according to FIG. 1 with the cover fully raised.

As can be seen from FIGS. 1 to 3, in particular, a roof opening 11 is provided in a fixed roof surface 10, which may be closed by a rigid cover 12 or, alternatively, can be partially opened. Roof opening 11 is encircled by a roof frame 13 which forms rain gutter 15 along front end 14 and along both sides of the roof opening. Guide rails 16, extending in the longitudinal direction of the vehicle, are mounted at each side of roof opening 11 at roof frame 13. Below cover 12, there is a sliding roof liner panel assembly which is designated in its entirety as 17. Assembly 17 has a tiltable slidable roof liner panel 18, and a non-tiltable sliding roof liner panel 19.

Liner assembly 17 closely follows the sliding movement of cover 12. For this sliding movement the panels 18, 19 are connected together by a means such as a tow link, while sliding liner panel assembly 17, itself, may be connected with cover 12 in any manner desired (not illustrated) for the purpose of being slid in accordance with the sliding displacement of the cover. For instance, clip connections between the forward end of sliding panel 18 and the driving elements connected with the cover, can be provided. The guide rails, the cover, the sliding panel and the operating parts of the sliding lifting roof essentially are in mirror image relationship with respect to a longitudinal center axis of the roof. Accordingly, the following text describes only the design and function of the assembly on one side.

A forward slider 21 and a rear slider 22 travel in guide rail 16, which sliders are secured to a support 23 of a lifting mechanism designated as 24, as a whole. Support 23 and its mirror image support on the opposite side of the roof (not shown) are connected by way of a transversely extending transport bridge 25. Transport bridge 25 is slidable in a conventional manner in the direction of cover displacement, which coincides with the longitudinal direction of the vehicle. For this purpose, a pressure resistant threaded cable may be used, which essentially engages the center of the transport bridge (see, for example, U.S. Pat. No. 4,056,274) and which is coupled to a drive motor, preferably, an electric motor, or a hand crank.

Cover 12, in the area of its forward end 26, is supported in a manner enabling pivotal movement about an axis parallel to its forward end in a conventional manner, e.g., by forward sliders which are slidably mounted on guide rails 16. In its rear area, cover 12 is supported on a support arm 27 by a connecting piece 28. The rear end of support arm 27 is pivotally connected to a lifting lever 30 by means of a bolt 29. The opposite end of lever 30 is pivotally connected to a slider 32 by way of connecting bolt 31. The slider 32 is longitudinally guided in a longitudinal slot 33 of a retaining bracket 34 formed on support 23, or firmly connected therewith. Retaining bracket 34 has a forwardly directed cam surface 36 which can cooperate with roller 37 that acts as a cam follower. Roller 37 is rotatably supported by bolt 29 at the end of lifting lever 30 opposite slider 32. The roller is formed of elastic material. The configuration of the elevating device described thus far, substantially corresponds to the design described in German No. OS 32 48 454 and corresponding U.S. patent application Ser. No. 530,716, filed Sept. 9, 1983, now U.S. Pat. No. 4,566,730. Lifting lever 30 has a laterally projecting retaining bracket pin 38 which rotatably supports a roller 39. Roller 39 cooperates with cam surface 40 of retaining bracket 34.

Connecting bolt 31, slider 32 and longitudinal slot 33 form an initial fixed path, while an additional fixed path is formed by the coaction of roller 39 with cam surface 40 in conjunction with the displacement movement of roller 37 along arm surface 36. The two fixed paths provide three point contact between lifting lever 30 and retaining bracket 34, whereby the assembly is designed such that elements 30, 31, 32 and 34 simultaneously experience low pretensioning when the roof cover is either lowered, is in the closed position, or at the beginning of the lifting process due to the resilient nature of the elastic material forming roller 37. As a result of this pretensioning, the relative movement between lifting lever 30 and retaining bracket 34 is free from play in this adjustment range. At the same time, it is ensured that, within the described adjustment range, a predetermined pivotal displacement of lever 30, in relation to bracket 34, is produced for every position of transport bridge 25, and inherently for retaining bracket 34, relative to guide rail 16.

A pin 42 (FIG. 7) laterally projects from the side of lever 30 facing away from retaining bracket 34. Pin 42 supports a roller 43 which constitutes one element of a sliding guide means designated 44. Advantageously, the sliding guide means is designed to simultaneously serve as a device for holding down the tiltable sliding roof liner panel when the cover is in a closed or lowered position. The sliding guide means, preferably is designed so that it imposes a constant height upon the tiltable sliding roof liner panel, relative to the guide rails, when the cover is in a closed or lowered position. Roller 43 engages in a guide slot 45 that is disposed at the side of lifting arm 47 facing lever 30. As will be evident from the description below, roller 43 and slot 45 form a cam means for coupling lifting arm 47 to lifting lever 30. Lifting arm 47 is pivotably connected to rotate about an axis of support 23 formed by a bolt 48, said axis extending transversely to the displacement direction of support 23. Guide means 44 also comprises a slider 51 pivotally attached to the free end 50 of a cantilever arm 49 (that is fixedly connected to lifting arm 47) so as to be rotatable about an axis that is parallel to the shaft of bolt 48 and the axis about which panel 18 is pivotal. Slider 51 has a guide channel 52 which is engaged by a longitudinally extending, lateral free edge of cross piece 53 of an angular lifting bracket 54. Lifting bracket 54, in turn, is secured to the top side of tiltable sliding roof liner panel 18. Slider 51, consequently, is longitudinally displaceable relative to sliding roof liner panel 18, causing its rear end 61 to be vertically displaced.

Figure 4:
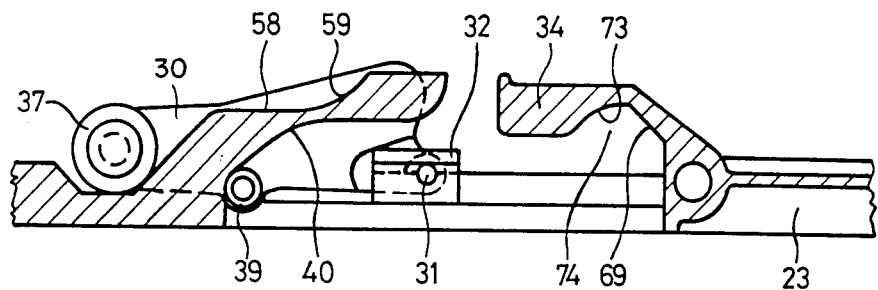
FIGS. 4, 6, 8, 10 and 12 show relative positions of the lifting lever and the support of the lifting mechanism in various cover positions.
Figure 5:
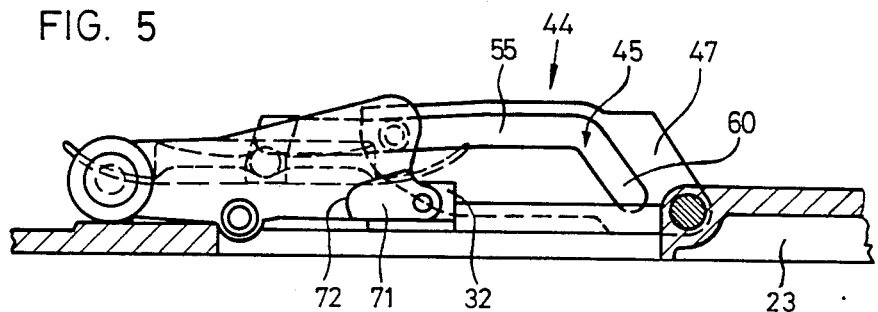
FIGS. 5, 7, 9, 11 and 13 show relative positions of the lifting lever and the lifting arm for cover positions according to FIGS. 4, 6, 8, 10 and 12, respectively.

In the lowered position of cover rear end 62, lever 30, retaining bracket 34 and lifting arm 47 assume the relative position according to FIGS. 4 and 5. Retaining bracket 34 is now positioned such that the forward end of longitudinal slot 33 abuts the forward end of slider 32. Roller 43 is near the forward end of leg 55 of slot 45, which extends substantially in the longitudinal direction of lifting arm 47. Slider 51 assumes a level which coincides with the one depicted in FIG. 1. Sliding roof liner panel 18 has now been brought into a position, which, in accordance with FIG. 1, is essentially parallel to guide rail 16. Displacement of transport bridge 25 rearwardly (to the right in the drawings) causes suppport 23 and retaining bracket 34 to be pulled rearwardly, taking along cover 12 and sliding roof liner panel 17, thereby at least partially opening roof opening 11.

Figure 6:
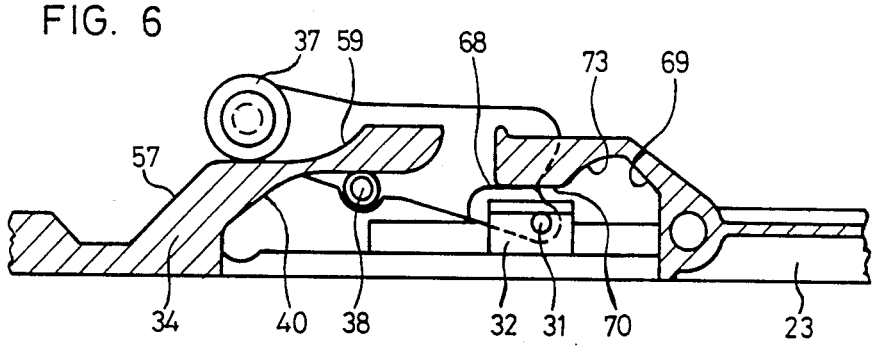
Figure 7:
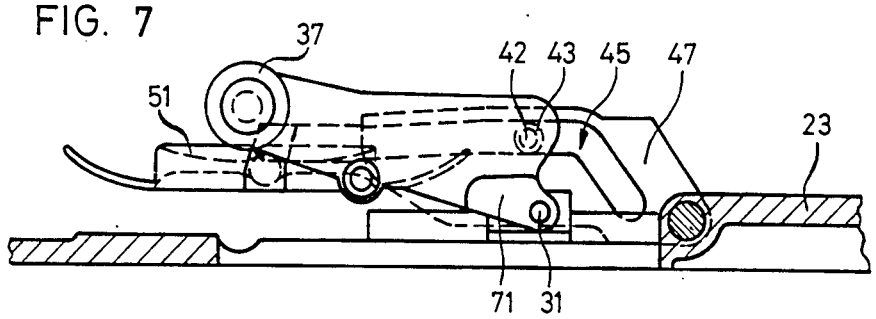

Conversely, when transport bridge 25, and with it, retaining bracket 34, are advanced forwardly (to the right in the drawings) from a position according to FIGS. 4 and 5, to a position depicted in FIGS. 6 and 7, longitudinal slot 33 is shifted relative to slider 32. At the same time, cam surface 40 is displaced towards roller 39 such that roller 39 ascends on cam surface 40, and roller 37 moves up an inclined section 57 of the cam surface 36. This causes lifting lever 30 to be displaced in a clockwise direction (compare FIGS. 4 and 6). Such pivotal movement causes cover rear end 62 to be pushed upwardly, so that cover 12 executes a pivotal movement in a counter clockwise direction (FIG. 1). As soon as retaining bracket 34 reaches a position relative to lifting lever 30, as depicted in FIG. 6, i.e, roller 37 has run up onto section 58 of cam surface 36, which is adjacent to section 57 and extends in parallel and longitudinal direction to the roof (in other words, is essentially horizontal), cover 12 has arrived at the closed position (FIG. 1). Thus, cover 12 is essentially flush with fixed roof area 10, guide slot 45 has been forwardly displaced (FIG. 7) towards roller 43; and roller 43 is still positioned in leg 55 of slot 45. The position of lifting arm 47 relative to support 23 is unchanged from the position depicted in FIG. 5. The sliding roof liner panel 18 remains in the position depicted in FIG. 1.

Section 58 defines an idle path. During passage through the idle path, the pivotal movement of lifting lever 30 and lifting arm 47 are kept constant regardless of the sliding movement of retaining bracket 34 An upward pivoting of lever 30 is prevented by abutment of roller 39 at cam surface 40. The idle path permits considerable tolerances in the operation of the sliding lifting roof without causing adverse effects. If, for instance, while in the relative position in accordance with FIGS. 6 and 7, a drive motor operating the sliding lifting roof is shut off, any lag or overrun does not cause adverse effects. Thus, the timing of the shut off of the drive motor can be varied within considerable tolerances without causing any ill effects.

Figure 8:
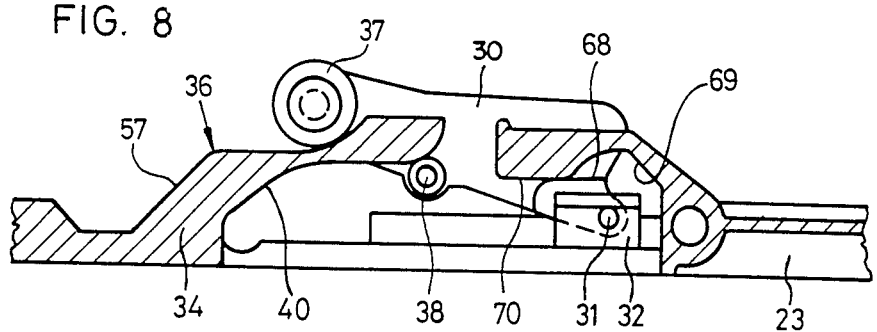
Figure 9:
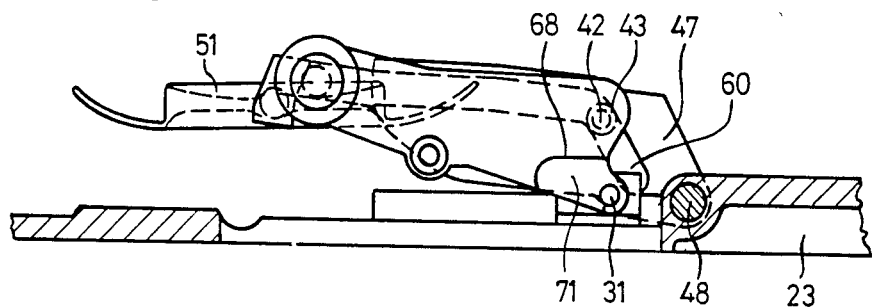

Further movement of retaining bracket 34 from a position according to FIG. 6 into a position according to FIG. 8 causes roller 37 to initiate ascent along inclined cam surface section 59, which is adjacent to section 58. A raising movement of cover 12 is thus initiated. At the same time, roller 43 has reached the initial portion of leg 60 of slot 45 which, relative to leg 55, is of an oblique angular configuration. The slope of leg 60 is substantially more inclined than the slope of section 59 of cam surface 36 and therefore causes lifting arm 47 to pivot about bolt 48 at an angular velocity which is greater than the angular velocity of the pivotal movement executed by lever 30 about connecting bolt 31.

Figure 14:
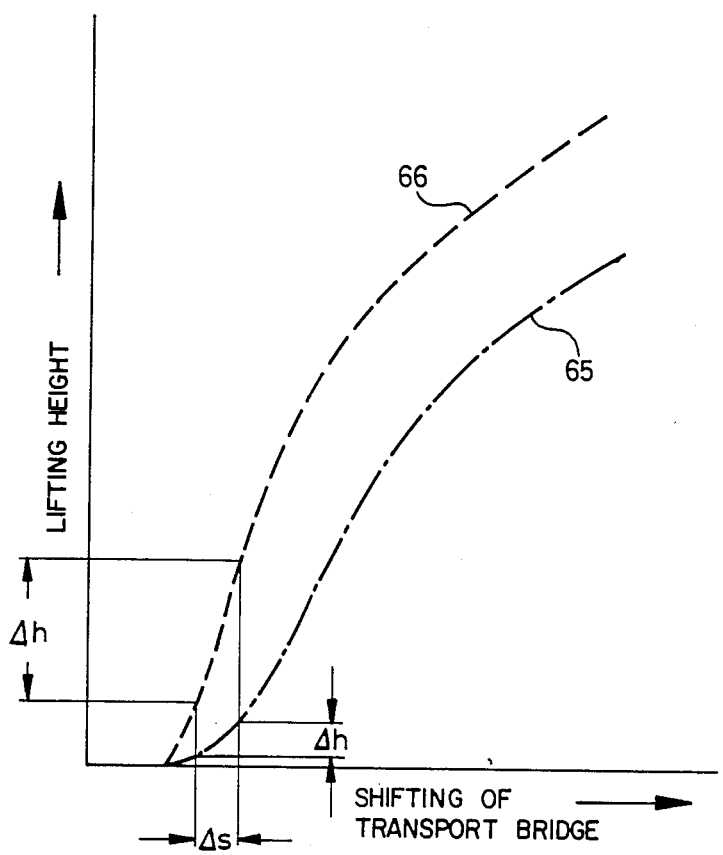
FIG. 14 shows the lifting characteristics for the cover and the tiltable sliding roof liner panel.

As can be clearly seen from the lifting characteristics 65, 66, depicted in FIG. 14, rear end 61 of sliding roof liner panel 18 consequently rises at a faster rate than rear end 62 of cover 12. Characteristics curves 65, 66 illustrate a lifting height of lever 30 or lifting arm 47, respectively, as the function of a displacement of support 23 produced by shifting of transport bridge 25. The rapid ascent of the rear end 61 prevents the otherwise undesirable effect of sliding roof liner panel 18 obstructing the view into the area between ascending cover rear end 62 and rear end 63 of roof opening 11.

Figure 10:
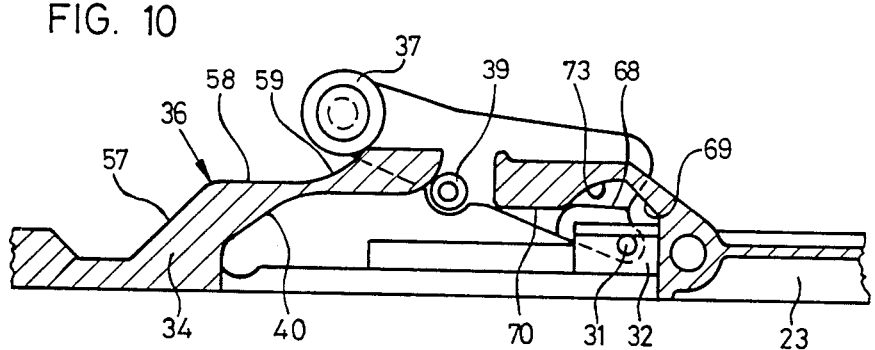
Figure 11:
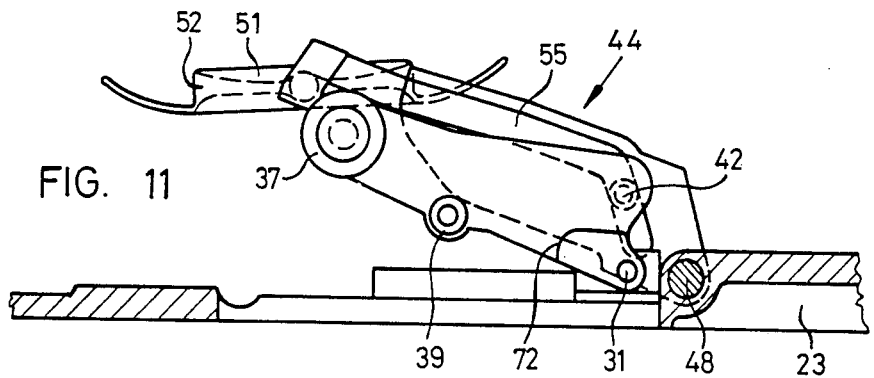

FIGS. 10 and 11 show the relative positions of elements 30, 34, 47 subsequent to a slight further forward movement of support 23. Roller 37 has now reached the upper end of cam surface section 59, and roller 39 comes free from cam surface 40. The rear end of longitudinal slot 33 abuts the rear end of slider 32. Interaction of roller 43 with leg 60 of guide slot 45 causes lifting arm 47 to be pivoted by a substantially wider angle compared to that of lifting lever 30. Cover 12 and sliding roof liner panel 18 assume the position depicted in FIG. 2.

During the movement of retaining bracket 34 between the relative positions depicted in FIGS. 4 and 10, lifting lever 30 and lifting arm 47 have performed a purely pivotal movement about the shaft of connecting bolt 31 or bolt 48, respectively. In other words, bolts 31 and 48 have assumed a fixed relative position with regard to guide rail 16. If retaining bracket 34 is now further advanced to the front, via transport bridge 25, starting from a position in accordance with FIGS. 10 and 11, interaction between the rear end of longitudinal slot 33 and slider 32 causes the lower end of lifting lever 30 to be carried along by retaining bracket 34, and the shaft of pivot bolt 31 further advances towards the front relative to guide track 16. The end portion of lifting lever 30 that is pivotally attached to support arm 27 moves up (FIG. 12), and the cover is raised in accordance with FIG. 3. Interaction between roller 43 and leg 60 of guide slot 45, causes lifting arm 47 in FIGS. 11 and 13 to be further pivoted in clockwise direction. Sliding roof liner panel 18 is brought into the raised position according to FIG. 3.

Figure 12:
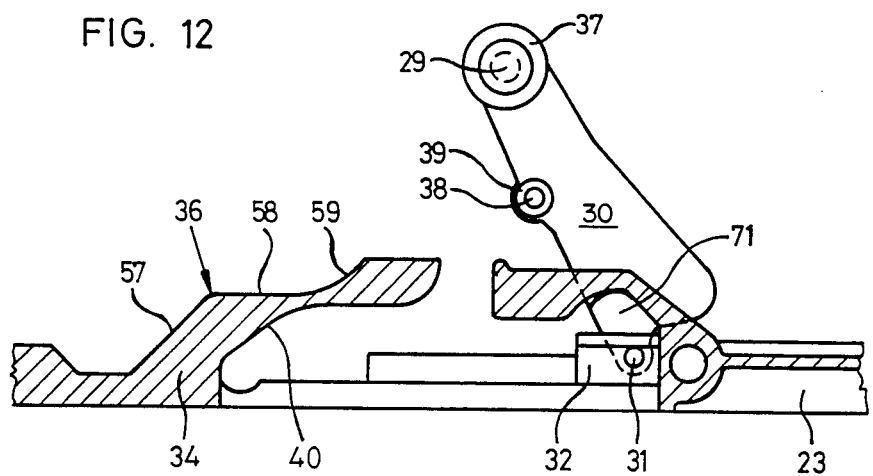
Figure 13:
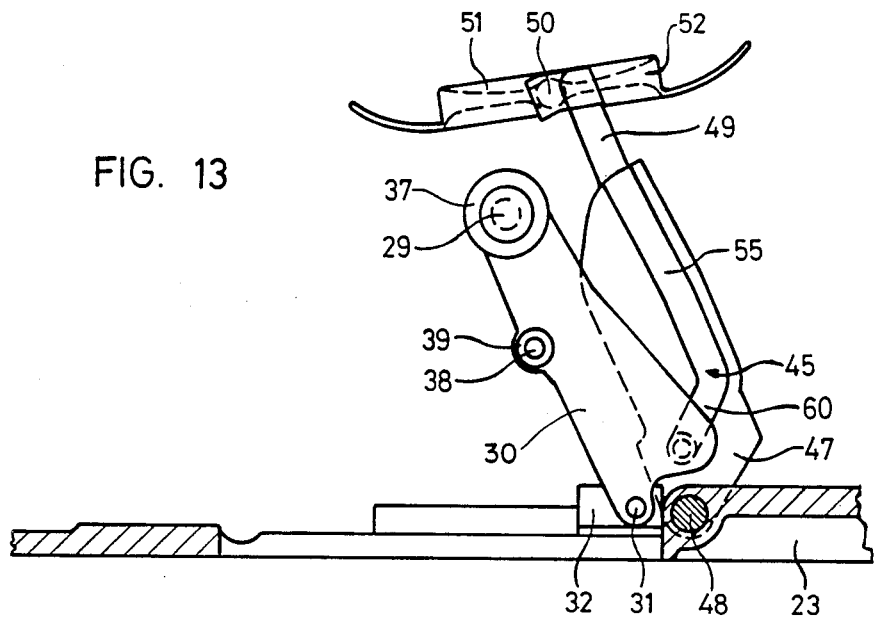

Lifting lever 30 has an abutment surface 68 in the proximity of connecting bolt 31 (FIG. 6) which, in the FIG. 12 position, rests against an abutment surface 69 of retaining bracket 34 and thereby limits the pivoting movement of lifting lever 30 towards sliding retaining bracket 34. During displacement of sliding retaining bracket 34 from the position approximating that of FIG. 6 into a position just prior to reaching one closely resembling that of the relative position according to FIG. 10, abutment surface 68 is displaced with play, relative to surface 70 of retaining bracket 34, which extends parallel to the longitudinal direction of slot 33. By way of an example, if during a burglary attempt, sufficient force is applied to cover 12, pin 38 may bend or break off. However, since the abutment surface 68 would then engage surface 70, these surfaces would serve as additional safeguards against undesirable swinging out of the cover.

Abutment surface 68 is formed by a laterally extending projection element 71 of lifting lever 30, defined at the forward end by a cylindrical abutment surface 72, whose center point of curvature coincides with the axis of pivot bolt 31. During the pivotal motion, i.e., when displacing lifting lever 30 from the FIG. 10 position into the position according to FIG. 12, abutment surface 72 coacts with cylindrical abutment surface 73 of recess 74 in retaining bracket 34, receiving projection element 71. Abutment surface 73 also extends concentrically to the axis of connecting bolt 31 when slider 32 abuts the rear end of longitudinal slot 33. Abutment surfaces 72, 73 consequently create additional bearing surfaces for the pivotal movement of lifting lever 30.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. Sliding and lifting roof construction for vehicles having a rigid cover, which in a closed position closes a roof opening in a fixed roof surface, said cover being mounted on guide tracks that extend along each side of the roof opening and connected to lifting mechanisms disposed at opposite sides thereof in a manner enabling the cover to be selectively pivotally lifted so as to raise a rear end of the cover above the fixed roof surface, and slidably displaced after lowering of its rear end below the fixed roof surface, and a tiltable, sliding roof liner panel, which is slidable together with the cover and which, upon raising the cover, is induced into a raising movement that, starting from said closed position, is faster than the raising movement of the cover; wherein the tiltable sliding roof liner panel, at least on one of its sides, is coupled with a pivotable lifting arm whose axis of pivot is positioned below said liner panel for substantially all raised positions of said liner panel, said pivotable lifting arm being coupled to a lifting lever of a respective one of said lifting mechanisms located at said one side of the coverby a means for positively guiding the pivotal movement of the lifting arm in response to movement of said lifting lever in a manner producing said pivotal movement of the liner panel which is faster than said pivotal movement of the cover.

2. Sliding and lifting roof according to claim 1, wherein said lifting arm and lifting lever are coupled by a sliding guide means.

3. Sliding and lifting roof according to claim 2, wherein the sliding guide means also forms a hold-down device for the tiltable sliding roof liner panel when the cover is in the closed position and when it is in a lowered position.

4. Sliding and lifting roof according to claim 3, wherein said sliding guide means is disposed such that it imposes a constant height upon the tiltable sliding roof liner panel, relative to the guide rails, when the cover is in the closed position and when it is lowered.

5. Sliding and lifting roof according to claim 4, wherein said sliding guide means comprises a slider that is pivotally attached to the lifting arm, said slider being rotatable about an axis that is parallel to a pivotal axis of said tiltable sliding roof liner panel, and is slidably displaceable in a longitudinal direction relative to the sliding roof liner panel.

6. Sliding and lifting roof according to claim 5, wherein the slider slidably engages a lifting bracket disposed on an upper side of the tiltable sliding roof liner panel.

7. Sliding and lifting roof according to claim 6, wherein one end of the lifting arm is pivotally attached to a support for said one lifting mechanism that is displaceable along a respective guide rail.

8. Sliding and lifting roof according to claim 5, wherein one end of the lifting arm is pivotally attached to a support for said one lifting mechanism that is displaceable along a respective guide rail.

9. Sliding and lifting roof according to claim 2, wherein said sliding guide means comprises a slider that is pivotally attached to the lifting arm, said slider being rotatable about an axis that is parallel to a pivotal axis of said tiltable sliding roof liner panel, and is slidably displaceable in a longitudinal direction relative to the sliding roof liner panel.

10. Sliding and lifting roof according to claim 9, wherein the slider slidably engages a lifting bracket disposed on an upper side of the tiltable sliding roof liner panel.

11. Sliding and lifting roof according to claim 10, wherein one end of the lifting arm is pivotally attached to a support for said one lifting mechanism that is displaceable along a respective guide rail.

12. Sliding and lifting roof according to claim 9, wherein one end of the lifting arm is pivotally attached to a support for said one lifting mechanism that is displaceable along a respective guide rail.

13. Sliding and lifting roof according to claim 9, wherein said lifting arm and lifting lever are arranged in a laterally side by side configuration, and wherein said sliding guide means further comprise a pin on the lifting lever which engages a slot within the lifting arm.

14. Sliding and lifting roof according to claim 5, wherein said lifting arm and lifting lever are arranged in a laterally side by side configuration, and wherein said sliding guide means further comprise a pin on the lifting lever which engages a slot within the lifting arm.

15. Sliding and lifting roof according to claim 4, wherein said lifting arm and lifting lever are arranged in a laterally side by side configuration, and wherein said sliding guide means further comprise a pin on the lifting lever which engages a slot within the lifting arm.

16. Sliding and lifting roof according to claim 3, wherein said lifting arm and lifting lever are arranged in a laterally side by side configuration, and wherein said sliding guide means further comprise a pin on the lifting lever which engages a slot within the lifting arm.

17. Sliding and lifting roof according to claim 2, wherein said lifting arm and lifting lever are arranged in a laterally side by side configuration, and wherein said sliding guide means further comprise a pin on the lifting lever which engages a slot within the lifting arm.

18. In a sliding and lifting roof of the type having a rigid cover, means for shifting said cover from a first closed position, wherein the panel closes an opening in a fixed roof surface, selectively into a second position wherein the cover has been upwardly tilted so as to have a rear edge thereof raised above the fixed roof surface and into a retracted position wherein the cover is rearwardly slid under the fixed roof surface after lowering of its rear edge, a slidable roof liner panel assembly disposed below said cover, and means for upwardly tilting a panel of said slidable liner panel assembly in response to shifting of said cover from said first position to said second position at a rate that is faster than the raising movement of the cover, the improvement for preventing vibration of the liner panel and rattling noises associated therewith wherein the means for upwardly tilting said liner panel comprises guide means for controlling the angular position of said liner panel in accordance with the position of said cover, said guide means being pivotally and slidably connected to said liner panel and having a lower pivot axis positioned below said liner panel for substantially all raised positions of said liner panel and being coupled to a lifting lever of said means for shifting said cover in a manner producing said upward tilting of said liner panel at a rate that is faster than the raising movement of the cover in response to movement of said lifting lever.

19. A sliding and lifting roof according to claim 18, wherein said guide means comprises a lifting arm, cam means for coupling said lifting arm to said lifting lever, and a pivotable slider means coupling said lifting arm to said liner panel.

20. A sliding and lifting roof according to claim 19, wherein said guide means also forms a hold-down device for the liner panel when the cover is in said closed position and when its rear edge has been lowered.

* * * * *